United States Patent [19]

Kawai

[11] Patent Number: 4,771,510
[45] Date of Patent: Sep. 20, 1988

[54] AUTOMATIC MEAT STUFFING APPARATUS

[75] Inventor: Kazuyoshi Kawai, Osaka, Japan

[73] Assignee: Futaba Denki Kogyo Kabushiki Kaisha, Osaka, Japan

[21] Appl. No.: 21,395

[22] Filed: Mar. 4, 1987

[30] Foreign Application Priority Data

Apr. 11, 1986 [JP] Japan .................. 61-084837

[51] Int. Cl.$^4$ ............................................. A22C 11/02
[52] U.S. Cl. ........................................... 17/33; 53/567
[58] Field of Search ................... 17/41, 42, 33; 53/567

[56] References Cited

U.S. PATENT DOCUMENTS

| | | | |
|---|---|---|---|
| 3,412,523 | 11/1968 | Raymond et al. | 17/42 X |
| 3,529,401 | 9/1970 | Sartore et al. | 17/42 X |
| 3,805,480 | 4/1974 | Cherio et al. | 17/42 X |
| 4,553,376 | 11/1985 | Okada et al. | 53/567 X |
| 4,587,689 | 5/1986 | Nakamura | 17/41 |
| 4,669,149 | 6/1987 | Kawai et al. | 17/41 X |

*Primary Examiner*—Willie G. Abercrombie
*Attorney, Agent, or Firm*—Antonelli, Terry & Wands

[57] ABSTRACT

An automatic meat stuffing apparatus which comprises a meat extruder including a filling nozzle, a casing supply unit including a carrier for carrying a tubular network casing from a reel to a point adjacent to the filling nozzle while running axially with the filling nozzle, and a net expander for expanding an open end of the casing through which meat is stuffed in the casing. The net expander is reciprocably movable along the filling nozzle. Pawls are provided for holding the casing, with the pawls being closable at a point adjacent to the open end of the filling nozzle. The pawls are openable so as to expand the open end of the casing and allow meat to be stuffed therein through the filling nozzle. A cutting and clipping device cuts the casing to a desired length and closes the casing with a clip, with the cutting and clipping device being located adjacent to the open end of the filling nozzle.

2 Claims, 8 Drawing Sheets

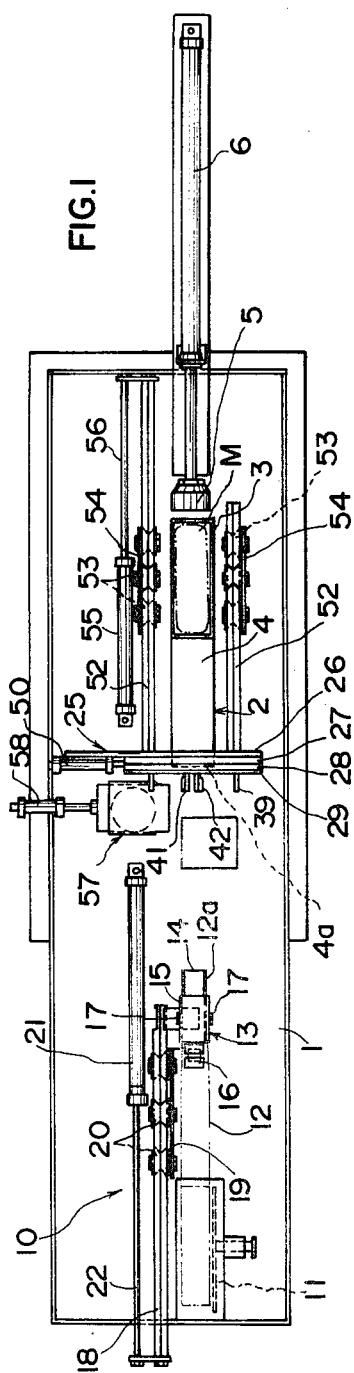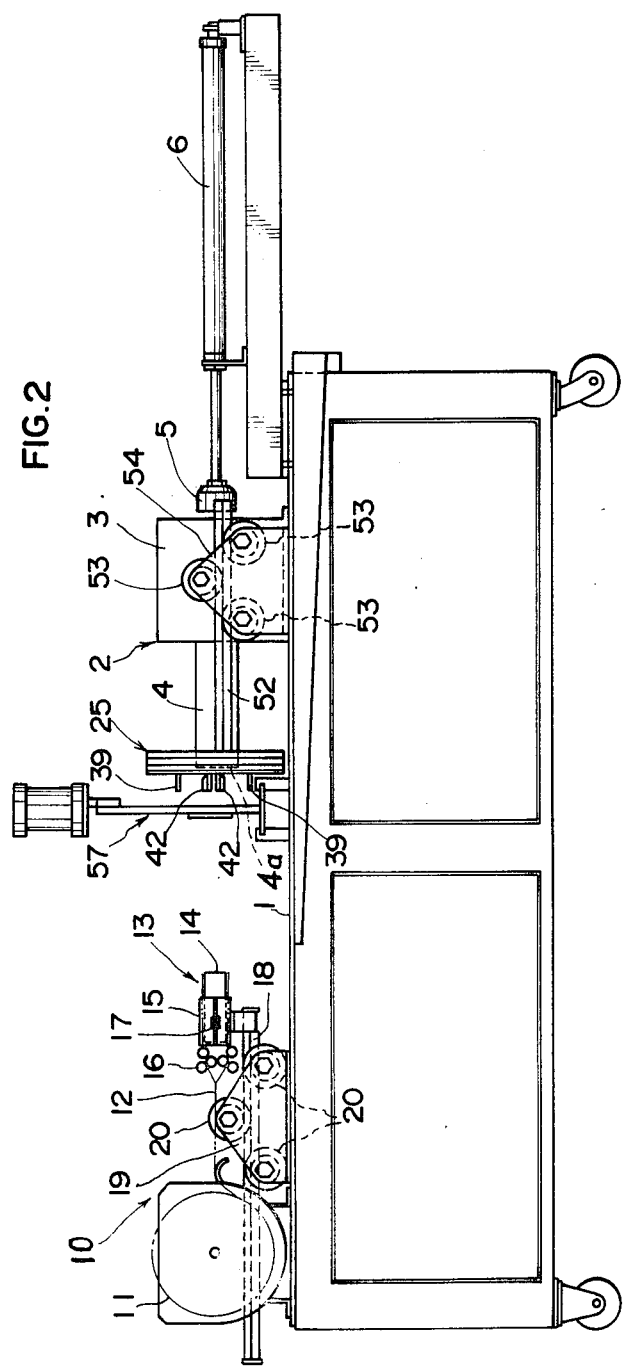

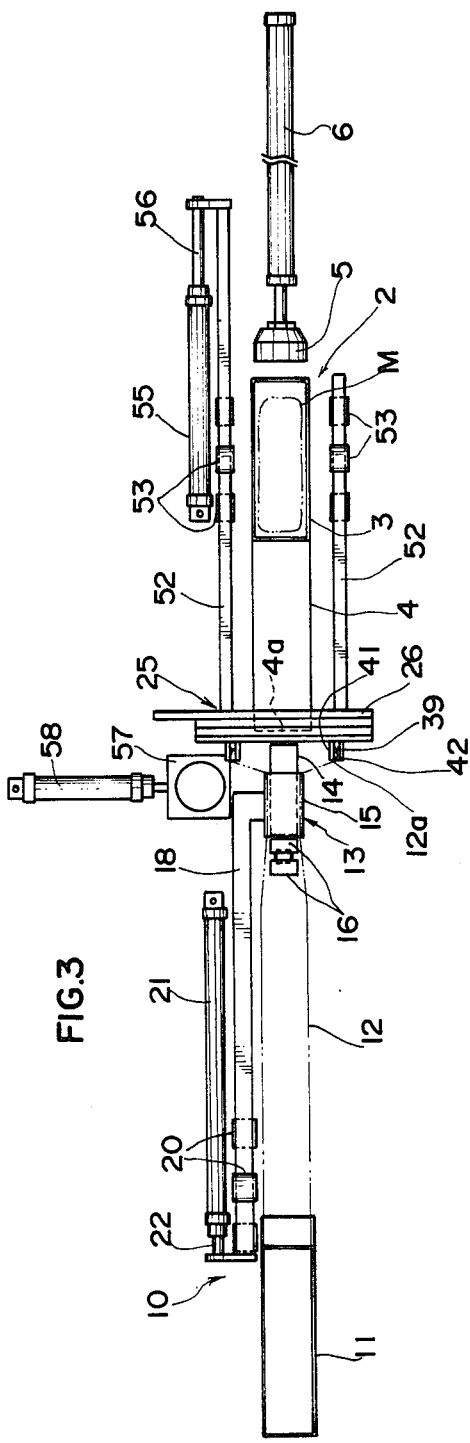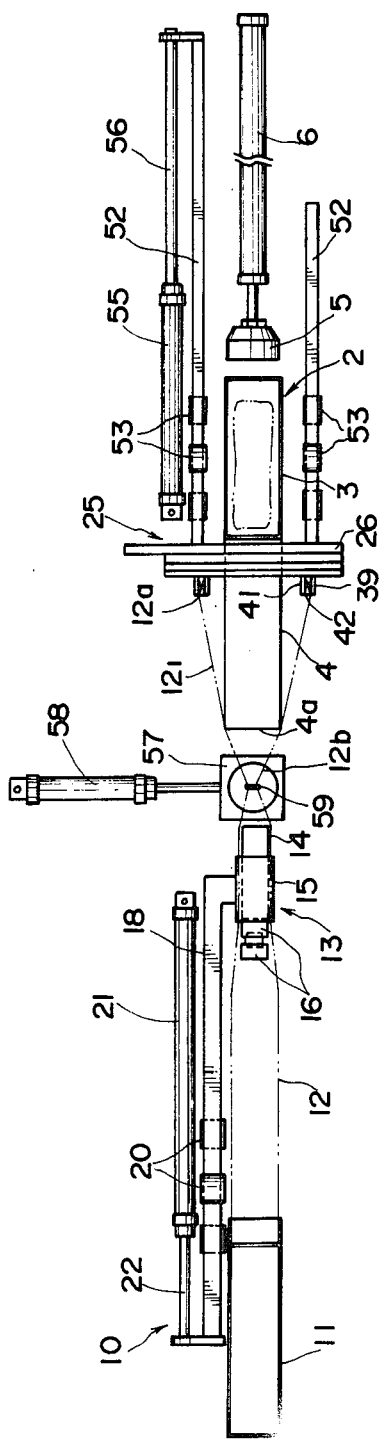

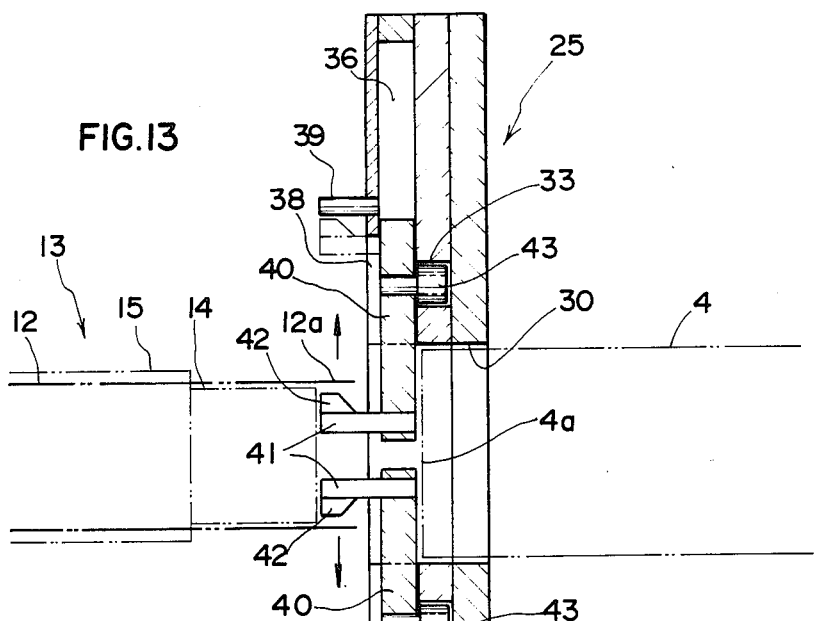
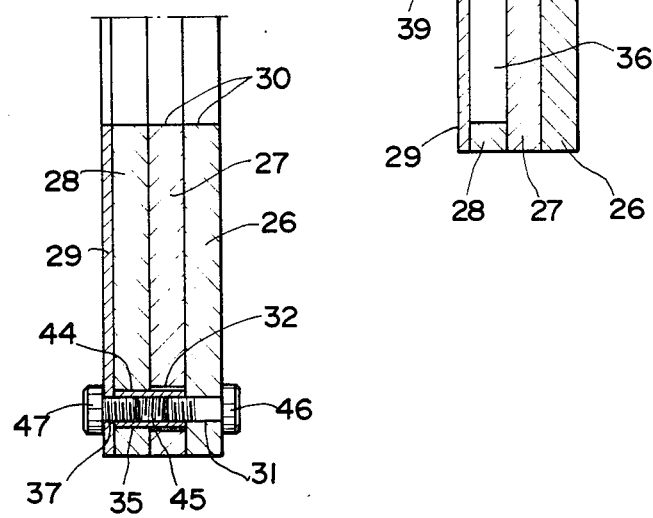
FIG.13
FIG.14

4,771,510

AUTOMATIC MEAT STUFFING APPARATUS

BACKGROUND OF THE INVENTION

1. Field of the Invention

The present invention relates to apparatus for automatically stuffing meat in a tubular, network casing, wherein the meat includes raw beef, chicken, pork or any other edible meat in the form of a lump.

2. Description of the Prior Art

To roast and season meat the common practice is that a lump of it is bound by cotton string in such a manner as to produce mesh patterns on the surface. This requires a lot of labor; therefore, to save labor a proposal is made for using a tubular casing of net instead of the string, as disclosed in Japanese Utility Model publication (examined) No. 58 (1983)-37762. This prior art teaches that the tubular casing of net is fixed by hand to the mouthpiece of a filling nozzle, and then the meat is extruded into the casing. Nevertheless this method requires labor in fixing the casing to the filling nozzle. In addition, the network casing is too supple and uncontrollable to handle, which requires skill and experience.

OBJECTS AND SUMMARY OF THE INVENTION

The present invention aims at solving the problems encountered by the conventional methods of stuffing meat in a tubular network casing, and is to provide an improved automatic meat stuffing apparatus, thereby leading to the less laborious and more efficient meat stuffing operation.

Other objects and advantages of the present invention will become more apparent from the following description when taken in conjunction with the accompanying drawings which shows, for the purpose of illustration only, one embodiment in accordance with the present invention.

According to advantageous features of the present invention, an automatic meat stuffing apparatus is provided which includes a meat extruder including a filling nozzle, a casing supply unit including a carrier for carrying a tubular network casing from a reel to a point adjacent to the filling nozzle while running axially with the filling nozzle, and a net expander is provided for expanding an open end of the casing through which meat is stuffed in the casing, with the net expander being reciprocally movable along the filling nozzle, and including pawls for holding the casing. The pawls are closable at a point adjacent to the open end of the filling nozzle, and openable so as to expand the open end of the casing and allow meat to be stuffed therein through the filling nozzle. A cutting and clipping device is provided for cutting the casing to a desired length and closing the casing with a clip, with the cutting and clipping device being located adjacent to the open end of the filling nozzle.

BRIEF DESCRIPTION OF THE DRAWINGS

FIG. 1 is a plan view showing an apparatus embodying the present invention;

FIG. 2 is a front view showing the apparatus of FIG. 1;

FIG. 3 is a schematic plan view showing the process of expanding the casing;

FIG. 4 is a schematic plan view showing the process of fixing the opened casing to the filling nozzle;

FIG. 13 is a cross-sectional view taken along the line 13—13 in FIG. 11; and

FIG. 14 is a cross-sectional view taken along the line 14—14 in FIG. 11.

DETAILED DESCRIPTION OF THE PREFERRED EMBODIMENT

Figure 5:
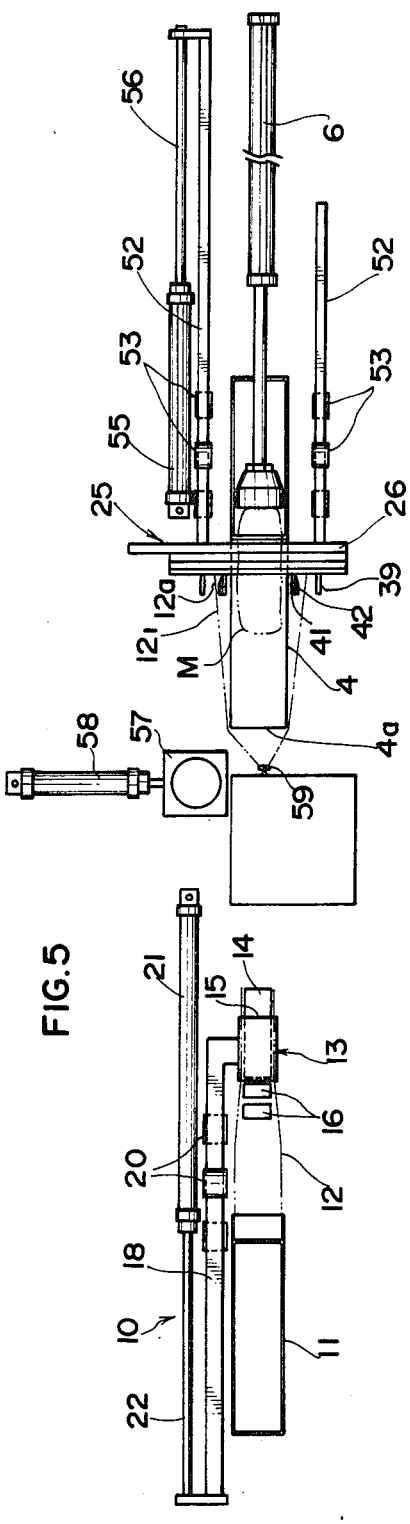
FIG. 5 is a schematic plan view showing the process of stuffing meat in the casing through the nozzle.

Referring now to the drawings when like reference numerals are used throughout the various views to designate like parts and, more particular, the FIGS. 1–6, according to these Figures, and automatic meat stuffing apparatus in accordance with the present invention includes a frame 1 on which a meat extruder 2 is mounted, the meat stuffing device generally designated by the reference numeral 2 including an open-topped hopper 3, and a filling nozzle 4. A pusher 5 reciprocably movable between the bottom of the hopper 3 and an open end 4a of the filling nozzle 4, whereby the meat (M), introduced in the hopper 3, is extruded through the open end 4a of the nozzle. The pusher 5 is driven by a pneumatic cylinder 6 or else a hydraulic device.

The net is supplied by a net supply device generally designated by the reference numeral 10, which includes a reel 11 and a carrier generally designated by the reference numeral 13 for pulling a tubular network casing 12 from the roll wound around the reel 11. The carrier 13 runs between the reel 11 and the open end 4a of the filling nozzle 4. The casing 12 is a fabric made by knitting warps and wefts into a long, continuous tubular form in such a manner so as to allow the warps and wefts to expand in the longitudinal and circumferential directions, respectively. Preferably the warps are made of cotton string and the wefts is made of cotton strings containing a core of rubber string, which offers an advantage that the casing is contractive because of the elasticity of the wefts.

The carrier 13 is the same as that disclosed in Japanese Patent Publication (examined) No. 50 (1975)-32315 (U.S. Pat. No. 3,919,739) and Japanese Patent Publication (examined) No. 52 (1977)-27715. The carrier 13 includes an inner cylinder 14 and an outer cylinder 15, wherein the inner cylinder 14 is longer than the outer cylinder 15. Between the two cylinders 14 and 15 a network casing 12 is inserted by guide rollers 16 arranged at the tail portion of the carrier, and extended up to the terminating end of the inner cylinder 14. In this state the casing 12 is held in a retainer 17 provided on the outer cylinder 15. In this way the casing 12 is joined to the carrier 13, which is caused to move until an opened end 12a of the casing 12 comes close to the open end 4a of the filling nozzle 4.

The carrier 13 is fixed to an end portion of a long guide rod 18 through the outer cylinder 15. The rod 18 has a rectangular cross-section, and is supported on a bracket 19 through three rollers 20, the bracket being fixed to the frame 1 in parallel with the axis of the filling nozzle 4 in such a manner as to be slidable in the axial direction. The backward end of the rod 18 is fixed to a piston 22 of the pneumatic cylinder 21. When the pneumatic cylinder 21 is operated the rod 18 is caused to run, thereby enabling the carrier 13 to move reciprocally along the axis of the filling nozzle 4.

A net expander generally designated by the reference numeral 25 as provided to cause the opened end of the tubular network casing 13 to mount on the end of the nozzle 4. The net expander 25 includes a fixing disc 26, a rotary disc 27, a guide disc 28 and a cover disc 29, all of which are overlaid one after another as best shown in FIG. 13, and is located near the open end 4a of the filling nozzle 4.

Figure 7:
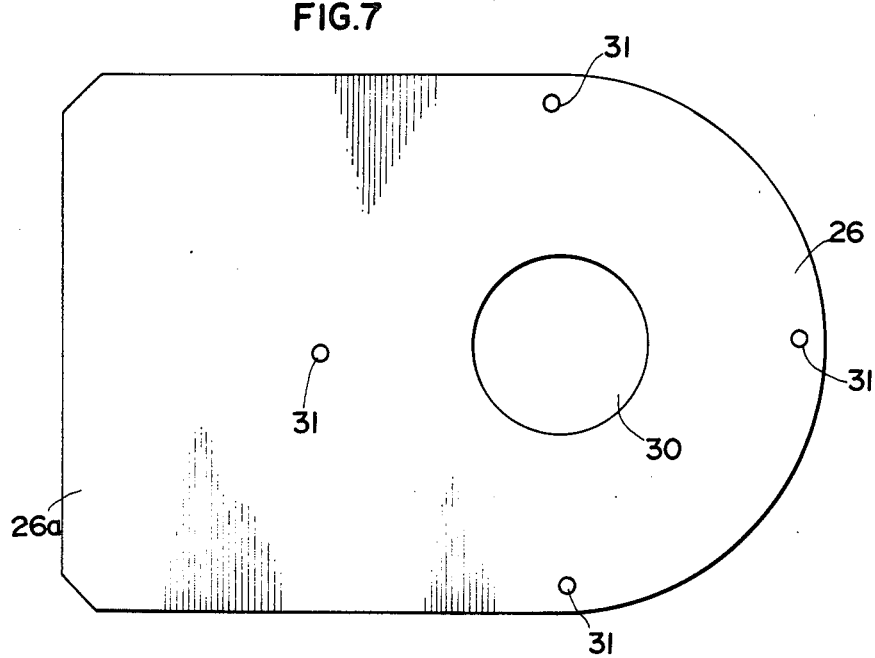
FIG. 7 is a front view showing a fixing disc.

As shown in FIGS. 7 to 10 each disc 26, 27, 28 and 29 has an aperture 30 in a center thereof, with the aperture 30 having a diameter of larger than the outside diameter of the filling nozzle 4. The fixing disc 26 has an extended portion 26a as shown in FIG. 7. The function and operation of the discs 26 to 29 will be described more fully hereinbelow.

The discs 27 and 28 are mounted on the fixing disc 26, and, for this purpose, four holes 31 therein are provided concentrically of the aperture 30 of the disc 26, preferably at quarterly angular displacements. The extended portion 26a of the fixing disc 26 is provided with a pneumatic cylinder 50 which operates the rotary disc 27. The fixing disc 26 is additionally provided with two guide bars 52 in parallel with the axis of the filling nozzle 4 as best shown in FIG. 1.

Figure 8:
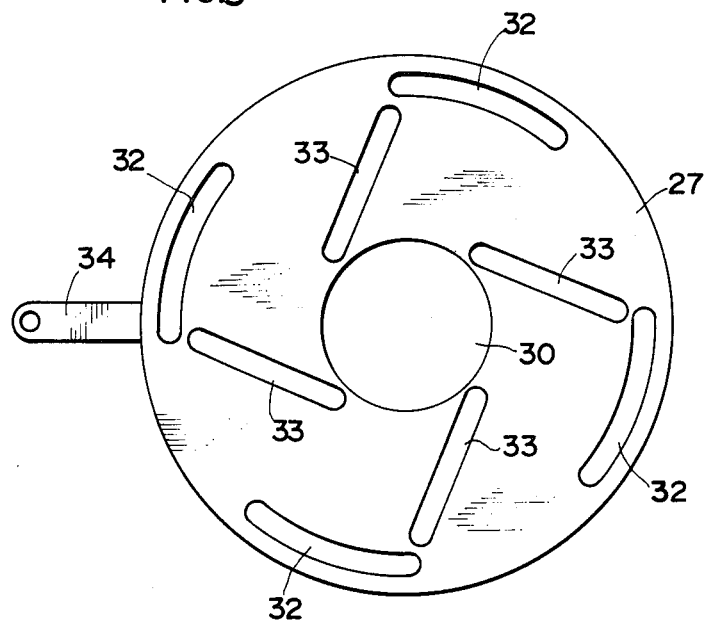
FIG. 8 is a front view showing a rotary disc.

As shown in FIG. 8, the rotary disc 27 is provided with a first set of four guide slots 32 produced along the circumference of the circle of the same size as that of the circle passing through the four holes 32 in the fixing disc 26. In addition, second set of four slots 33 are provided, with the second set of slots 33 respectively starting from a point adjacent to one end of associated slots 32 of the first set of slots and terminating at a point adjacent to the circumference of the aperture 30. The second set of slots 32 function as cam grooves, and are inclined at a given angle to the radial direction of the disc 27. A lever 34 projects radially from the disc 27 for connection to a piston rod 51 of a pneumatic cylinder 50.

Figure 9:
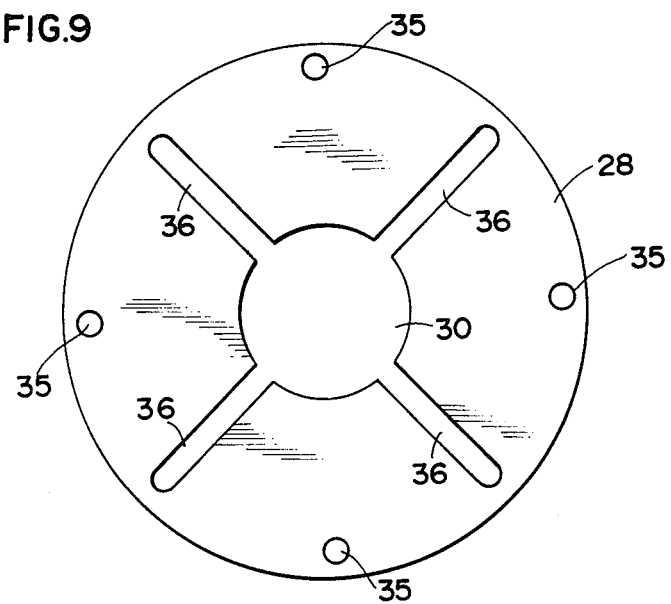
FIG. 9 is a front view showing a guide disc.

As shown in FIG. 9, the guide disc 28 is provided with four holes 35 at positions corresponding to the hole 31 in the disc 26. In addition the disc 28 is provided with guide slots 36 radially produced from the aperture 30, with each of the guide slots being open in the aperture 30, and extending toward a point between the adjacent holes 35.

Figure 10:
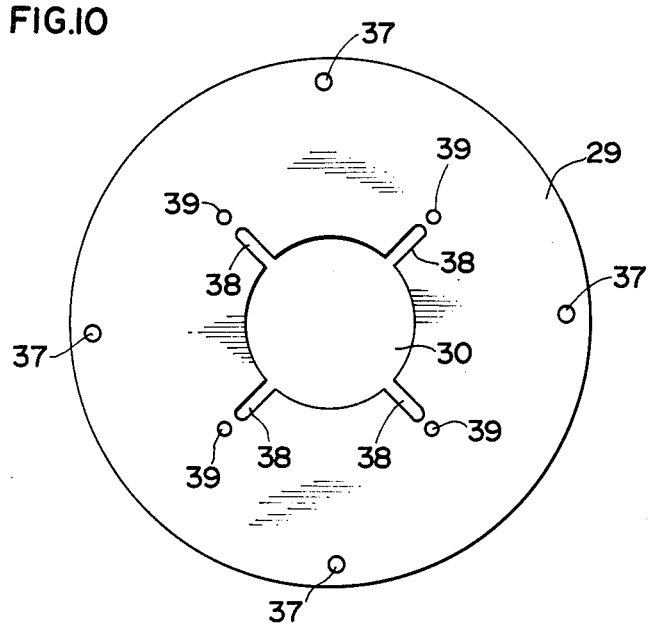
FIG. 10 is a front view showing a cover disc.

Sliders 40 are slidably fitted in the guide slots. The function and operation of the sliders 4 will be described more fully hereinbelow:

Referring to FIG. 10, the cover disc 29 is provided with holes 37 at positions corresponding to the holes 31 and 35 in the disc 26 and 28. In addition four guide slots 38 are produced radially from the aperture 30, with the guide slots 38 extending toward a point between the adjacent holes 37 at positions corresponding to the guide slots 36 in the disc 28, and being shorter and narrower than the guide slots 36. The guide slots 38 are open in the aperture 30. A pawl of the slider 40 is movably fitted in the guide slots 38. A stop 39 is situated at a point adjacent to the closed end of the guide slot 38, so as to hold the open end 12a of the casing 12 in cooperation with the pawl 42.

Figure 11:
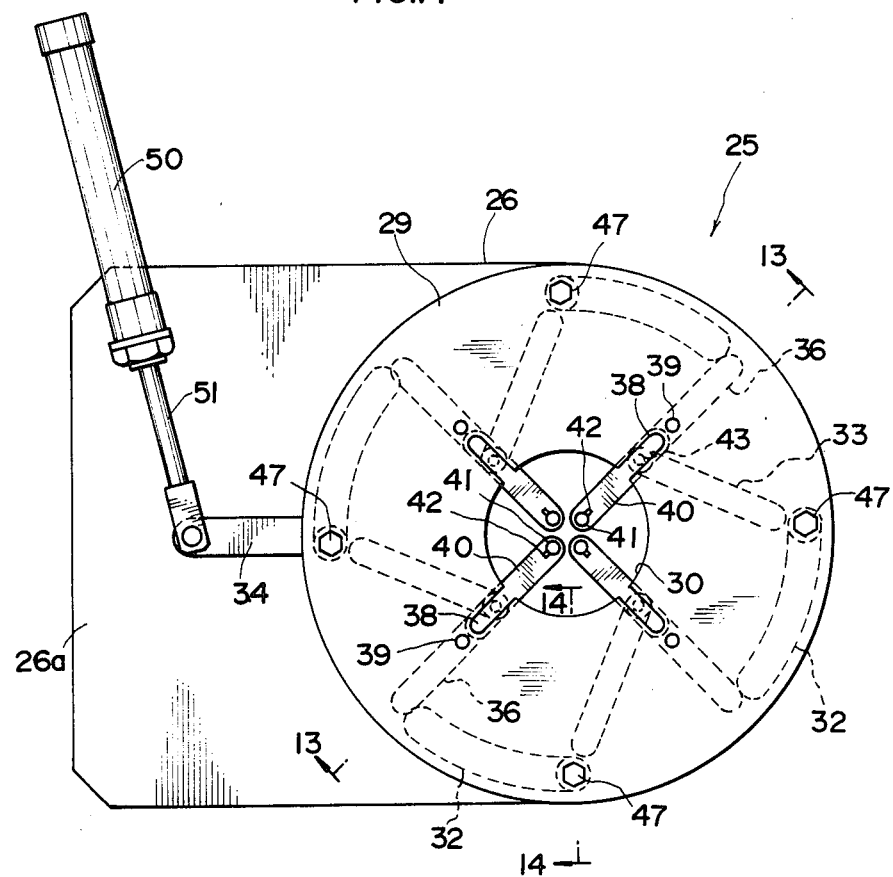
FIG. 11 is a front view showing the pawls of the net expander being closed.

Referring to FIGS. 11 and 13, the slider 40 is slidably fitted in the guide slots 36 of the guide disc 28, and provided with an engaging pin 41, which is projectable in parallel with the axis of the filling nozzle 4. In addition the slider 40 is provided with a cam follower 43 rotatively fitted in the cam grooves 33 in the rotary disc 27.

The four discs 26 to 29 are overlaid one after another so as to constitute a unit as best shown in FIG. 14. First, bushes 44 are inserted in the guide slots 32 in the rotary disc 27, and then the bushes 44 are fixed in the holes 35 in the guide disc 28. Screws 46 are inserted in the holes 32 in the fixing disc 26, and screws 47 are inserted in the holes 37 in the cover disc 29. Both screws 46 and 47 are engaged with threads 45 in the bushes 44. In this way the guide disc 28 and the cover disc 29 are fastened to the fixing disc 26, with a space left between the guide slots 32 and the bushes 44 for allowing the rotary disc 27 to rotate.

Figure 12:
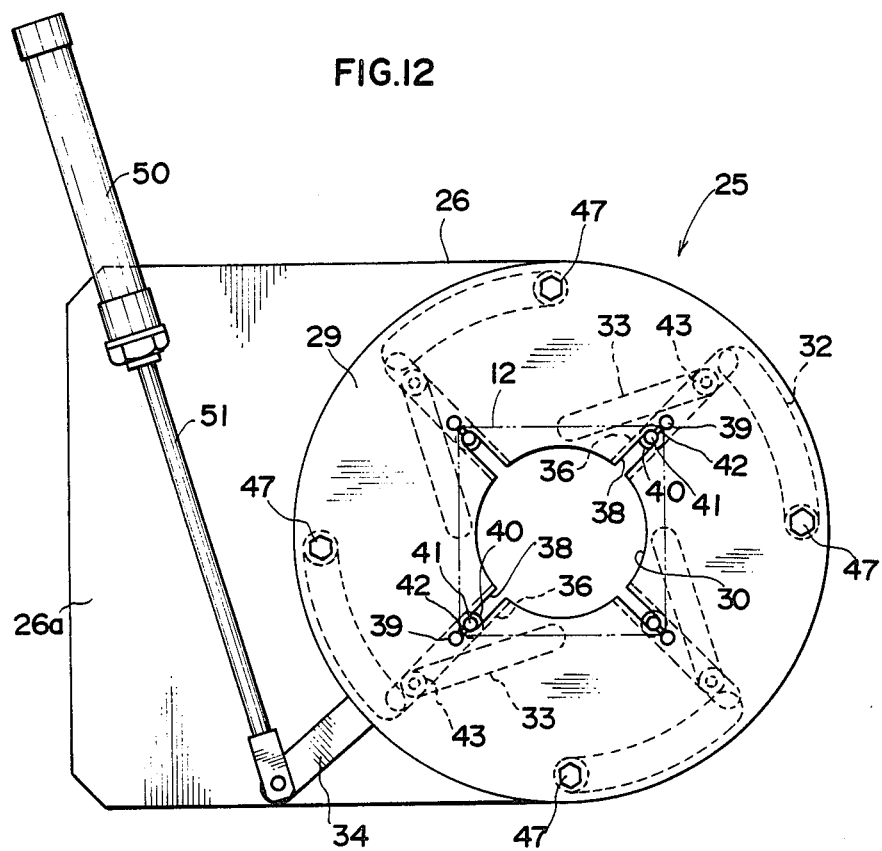
FIG. 12 is a front view showing the pawls of the net expander being opened.

When the cam followers 43 are situated at the innermost end of the cam grooves 33 as shown in FIG. 11, the sliders 40 project until their top ends gather around the axis of the filling nozzle 4, thereby enabling their pawls 42 to come together. When the cam followers 43 come to the outermost end of the cam grooves 33 by operating the pneumatic cylinder 50 to rotate the sliders 40, the pawls 42 are caused to move outward in a radial direction as shown in FIG. 12.

The net expander 25 is opened and closed in the above-mentioned manner. When the net expander 25 is opened, as shown in FIG. 12, the top portion of the filling nozzle 4 is accommodated in the apertures 30. At this stage the guide rods 52 are ready to move axially with the filling nozzle 4 by the rollers 53. The rollers 53 are rotatively supported on the framework 1 through the brackets 54, wherein the two rollers 53 carry the guide rods 52 from below and the other roller in the middle bears them from above as shown in FIG. 2. One of the guide rods 52 is longer than the other, and the longer rod is connected to a piston rod 56 of a pneumatic cylinder 55, whereby the net expander 25 is reciprocally moved along the axis of the filling nozzle 4.

There is provided a cutting and clipping device generally designated by the reference numeral 57 situated adjacent to the top end portion of the filling nozzle 4, with the cutting and clipping device 57 being operated by a pneumatic cylinder 58 and moved transversly; that is, in a direction perpendicular to the axis of the filling nozzle 4. The cutting and clipping device 57 is known in the art, and a description of it will be omitted for simplicity.

The apparatus described above operates in the following manner:

FIGS. 1 and 2 show the state from which the apparatus starts its operation. The carrier 13 is situated at the starting position with holding the forward end portion of the casing 12. The net expander 25 is situated at a point near the open end 4a of the filling nozzle 4 with the pawls 42 being closed.

The pneumatic cylinder 21 is operated to move the carrier 13 toward the filling nozzle 4, and, while doing so, the casing 12 is pulled out of the reel 11 and its top end portion 12a covers the four pawls 42 as shown in FIG. 13. At this stage the casing 12 is released from the carrier 13. Then the pneumatic cylinder 50 is operated to rotate the rotary disc 27 from the position shown in FIG. 11 to that shown in FIG. 12, thereby causing the pawls 42 to open with the top end portion 12a of the casing placed thereon. The expanded top end of the casing is maintained by the pawls 42 and the stop means 39, which prevents the casing 12 from separating from the carrier during operation. (FIGS. 3, 4 and 12)

Then the pneumatic cylinder 55 is operated to move the net expander 25 toward the hopper 3. In accordance with the movement of the net expander 25 and expanded top end of the casing covers the filling nozzle 4; then the carrier 13 is returned until the top end of the inner cylinder 14 comes to a point at which the casing 12 is cut.

Then the pneumatic cylinder 58 is operated to move the cutting and clipping device 57 to a point between the open end 4a of the filling nozzle 4 and the carrier 13. The device 57 cuts the casing 12 at a point near the open end 4a of the filling nozzle, and closes the cut end 12b thereof with a clip 59. In this way a unit casing $12_1$ is formed with one end 12a being open and the other end being closed with the clip 59 as best shown in FIG. 5.

The carrier 13 is returned to its starting position shown in FIGS. 1 and 2, with holding the subsequent casing, and waits for the next operation.

Figure 6:
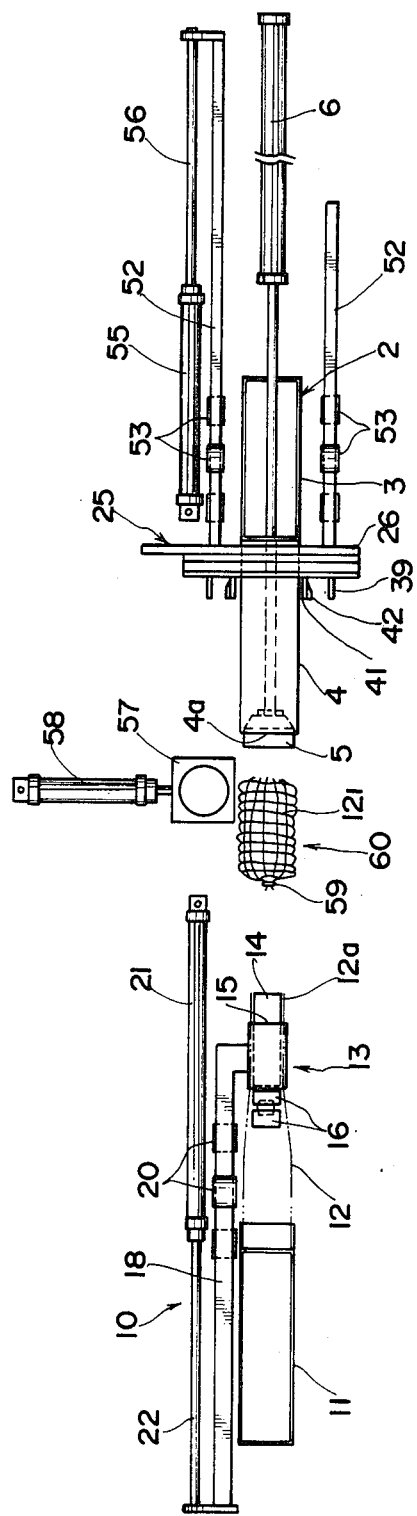
FIG. 6 is a schematic plan view showing the completion of the meat stuffing process.

Referring to FIG. 5, the pusher 5 is operated by the pneumatic cylinder 6 and extrudes the meat (M) into the unit casing $12_1$ from the hopper 3 through the open end 4a of the filling nozzle 4. At this stage, the pawls 42 are slightly moved to a closing position, and disengaged from the cooperative state with the stops 39, thereby making the open end 12a of the casing releasable from the pawls 42. The meat (M) is continuously extruded in the unit casing $12_1$ until it is filled with the meat and becomes separated from the filling nozzle 4 as shown in FIG. 6. Once the stuffed casing 60 has been separated from the filling nozzle 4 the strings of the net spontaneously contract, thereby enabling the open end 12a of the unit casing $12_1$; to close in contact with the meat without using a clip. In this way a finished sausage is produced. The same procedure is repeated.

As is evident from the foregoing description a great advantage of the present invention is that the labor is considerably saved in stuffing meat in uncontrollable network casings, thereby enhancing the working efficiency and reducing the labor cost.

What is claimed is:

1. An automatic meat stuffing apparatus comprising:
a meat extruder including a filling nozzle;
a casing supply unit including a carrier means for carrying a tubular network casing from a reel to a point adjacent to the filling nozzle while running axially with the filling nozzle;
a net expander means for expanding an open end of the casing through which meat is stuffed in the casing and for mounting the casing around the open end of the filling nozzle, the net expander being reciprocably movable along the filling nozzle, and including pawls for holding the casing, wherein the pawls are closable at a point adjacent to the open end of the filling nozzle, and are openable so as to expand the open end of the casing and allow meat to be stuffed therein through the filling nozzle; and
a cutting and clipping means for cutting the casing to a desired length and closing the casing with a clip, the cutting and clipping means being located adjacent to the open end of the filling nozzle.

2. An automatic meat stuffing apparatus as defined in claim 1, wherein the cutting and clipping means is movable transversly with respect to the axis of the filling nozzle.

* * * * *